United States Patent [19]

Brezoczky

[11] Patent Number: 5,801,464
[45] Date of Patent: Sep. 1, 1998

[54] PRESSURIZED AIR-IONIZATION GROUND FOR AN AIR BEARING SPINDLE

[75] Inventor: Blasius Brezoczky, San Jose, Calif.

[73] Assignee: Phase Metrics, San Diego, Calif.

[21] Appl. No.: 766,899

[22] Filed: Dec. 13, 1996

[51] Int. Cl.[6] .................. H02K 23/00; H02K 23/66; H02K 7/08
[52] U.S. Cl. .................. 310/67 R; 310/90; 384/100; 384/108; 361/212
[58] Field of Search .................. 310/67 R, 90; 360/97.02, 99.04, 98.07, 99.08; 384/100, 108, 133, 134; 361/212, 213, 220; 277/80

[56] References Cited

U.S. PATENT DOCUMENTS

| | | | |
|---|---|---|---|
| 4,026,701 | 5/1977 | Till et al. | 91/1 R |
| 4,623,952 | 11/1986 | Pexton | 361/220 |
| 4,673,997 | 6/1987 | Gowda et al. | 360/107 |
| 4,898,480 | 2/1990 | Raj et al. | 384/446 |
| 5,140,479 | 8/1992 | Elsing et al. | 360/97.01 |
| 5,251,081 | 10/1993 | Cossette et al. | 360/97.02 |
| 5,323,076 | 6/1994 | Hajec | 310/90 |
| 5,328,272 | 7/1994 | Ainslie et al. | 384/112 |
| 5,334,895 | 8/1994 | Morioka et al. | 310/678 |
| 5,367,416 | 11/1994 | Cossette et al. | 360/97.02 |
| 5,396,135 | 3/1995 | Iwazaki et al. | 310/90 |
| 5,430,590 | 7/1995 | Ainslie et al. | 360/98.07 |
| 5,454,724 | 10/1995 | Kloeppel et al. | 439/17 |
| 5,473,484 | 12/1995 | Dunfield et al. | 360/99.08 |
| 5,550,689 | 8/1996 | Boutaghou et al. | 360/99.08 |
| 5,559,651 | 9/1996 | Grantz et al. | 360/99.08 |

Primary Examiner—Thomas M. Dougherty
Assistant Examiner—B. Mullins
Attorney, Agent, or Firm—Blakely Sokoloff Taylor & Zafman

[57] ABSTRACT

A spindle motor assembly which utilizes a ionized air bearing to provide a conductive path through the assembly. The spindle motor assembly includes a spindle shaft that is located within a housing and rotated by an internal motor. The assembly also contains an air bearing which allows relative movement between the spindle shaft and the housing. The air bearing is supplied by a source of air that is ionized by an ionizer. The ionized air provides a conductive path between the spindle and the housing. The spindle may be coupled to a clamp that holds a magnetic disk within a disk certifier. The magnetic disk is electrically grounded to the housing through the chuck, the spindle and the ionized air bearing.

9 Claims, 1 Drawing Sheet

PRESSURIZED AIR-IONIZATION GROUND FOR AN AIR BEARING SPINDLE

BACKGROUND OF THE INVENTION

1. Field of the Invention

The present invention relates to a spindle motor that is grounded through an air bearing.

2. Description of Related Art

Hard disk drives contain magnetic transducers that magnetize and sense the magnetic field of a rotating disk(s). The disks are typically tested before being assembled into a hard disk drive unit in an apparatus commonly referred to as a disk certifier. A disk certifier contains a spindle motor that is mounted to a test stand. The spindle motor contains a chuck that can be actuated to hold a magnetic disk. The spindle motor rotates the disk relative to a recording head that magnetizes and then senses the magnetic field(s) of the disk. The recording head is coupled to test circuitry which can process and analyze the disk based on the sensed magnetic field(s).

It is important to electrically ground the disk to minimize the noise of the test signal and to prevent an electrostatic build-up on the disk surface. The disk is typically grounded through the spindle motor. The spindle motor typically contains a conductive ball bearing that is pressed against the distal end of an internal spindle shaft. The ball provides a conductive path between the spindle and the test stand while allowing the spindle and disk to spin relative to the recording head. The recording head typically operates in the microvolt range. Any electrical noise can reduce the accuracy of the certifier. It is therefore imperative that the spindle have a reliable conductive path to the test stand.

It has been found that the ball bearing is a somewhat unreliable contact pad for the spindle motor. The electrical resistance of the contact pad is a function of the pressure between the ball bearing and the spindle. Vibrations in the spindle motor may vary the pressure and the resistance of the ground path. It has been found that variations in pressure will introduce electrical noise that degrade the accuracy of the certifier. Additionally, it is desirable to operate the spindle motor at high speeds in the range of 15,000 revolutions per minute (RPM). The frictional forces between the ball bearing and spindle shaft impede the rotation of the spindle motor. It would be desirable to provide a spindle motor which has a reliable ground path that produces lower frictional forces than contact pads of the prior art.

SUMMARY OF THE INVENTION

The present invention is a spindle motor assembly which utilizes a ionized air bearing to provide a conductive path through the assembly. The spindle motor assembly includes a spindle shaft that is located within a housing and rotated by an internal motor. The assembly also contains an air bearing which allows relative movement between the spindle shaft and the housing. The air bearing is supplied by a source of air that is ionized by an ionizer. The ionized air provides a conductive path between the spindle shaft and the housing. The spindle may be coupled to a chuck that holds a magnetic disk within a disk certifier. The magnetic disk is electrically grounded to the housing through the chuck, the spindle and the ionized air bearing.

DETAILED DESCRIPTION OF THE INVENTION

Figure 1:
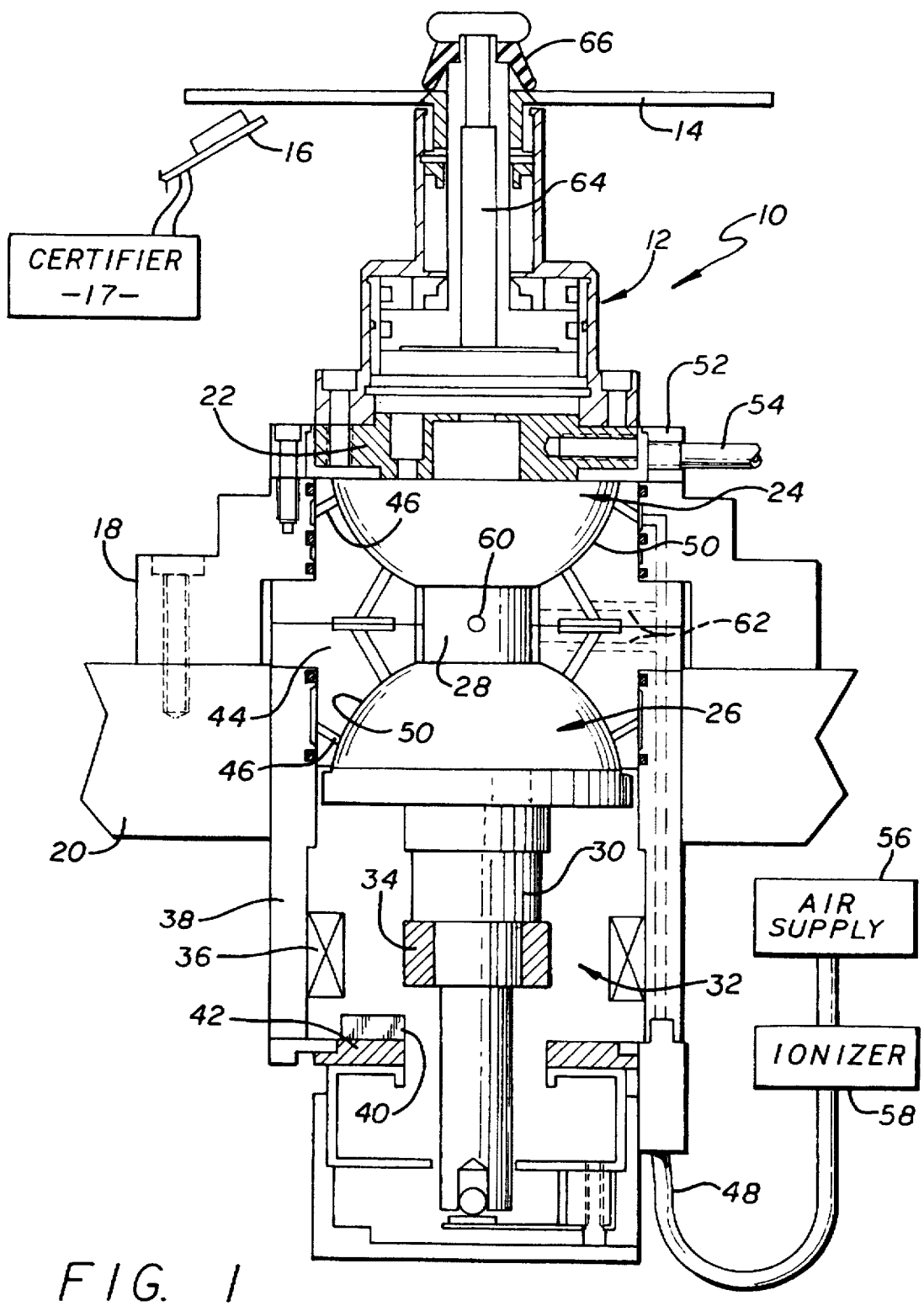
FIG. 1 is a cross-sectional view of a spindle motor of the present invention.

Referring to the drawings more particularly by reference numbers, FIG. 1 shows a spindle motor 10 of the present invention. The spindle motor 10 includes a chuck 12 that captures a magnetic disk 14. The motor 10 rotates the disk 14 relative to a magnetic recording head 16. The recording head 16 is attached to a certifier 17. The recording head 16 magnetizes and then senses the magnetic fields of the disk 14 in accordance with a disk certification test routine. The certifier 17 processes and analyzes the sensed magnetic fields to test the disk 14. The motor 10 may contain an outer housing collar 18 that is bolted to a table 20.

The chuck 12 is fastened to a mounting plate 22 that is attached to a first bearing 24. The first bearing 24 is connected to a second bearing 26 by a shaft 28. The second bearing 26 is attached to a spindle shaft 30 of an electric motor 32.

The electric motor 32 includes a magnet assembly 34 that is attached to the spindle shaft 30 and coupled to a coil assembly 36. The coil assembly 36 is fastened to an outer motor housing 38. The motor 32 rotates the spindle shaft 30, bearings 24 and 26 and chuck 12 to spin the disk 14. The motor 32 may rotate the spindle shaft 30 at speeds of at least 15,000 revolutions per minute (RPM). The motor 32 may have an encoder 40 that is mounted to an end plate 42. The end plate 42 can be rotated to adjust the position of the encoder 40.

The bearings 24 and 26 rotate relative to a housing 44. The bearings 24 and 26 are each constructed as a segment of a sphere that is located within corresponding spherical shaped openings of the housing 44. The housing 44 is typically constructed from aluminum that has an outer hardened layer of aluminum oxide $Al_2O_3$. The bearings 24 and 26 are typically constructed from aluminum with a hardened layer of carbon that is electrically conductive.

The housing 44 has a plurality of air bearing channels 46 that are in fluid communication with a positive air pressure hose 48. The channels 46 may be brass inserts (not shown), that are screwed into the housing 44. The hose 48 provides air pressure that creates air bearings 50 between the housing 46 and the bearings 24 and 26. The motor 10 may have a vacuum gland 52 that is mounted to the outer collar 18. The vacuum gland 52 is attached to a vacuum hose 54. The vacuum hose 54 provides a return line for the air of the air bearings 50. The vacuum line 54 will also draw out any particles that are created by the bearing surfaces of the motor 10 to insure that the disk 14 is not contaminated.

The pressure hose 48 is coupled to an air supply 56 that provides a flow of air to the air bearing channels 46 and air bearings 50. The air provided to the channels 46 is ionized by an ionizer 58. By way of example, the ionizer 58 may contain a tungsten rod that has a high voltage potential. Although it is to be understood that any type of device for ionizing air may be employed. The ionized air provides a conductive path between the bearings 24 and 26, and the housing 44. Although air is described, it is to be understood that any ionized fluid may be used in the present invention.

It is desirable ionize the air so that the resistance of the air bearings 50 is no greater than 0.5 ohms. The resistance R can be computed from the equation:

$$R = \frac{b}{\mu \cdot q \cdot \exp 2 \cdot n \cdot A}$$

where:
μ=the mobility of an electron in air.
q=the charge of an electron.
n=the ion density per unit volume.
A=the area of the air bearing.
b=the thickness of the air bearing.

The connecting shaft 28 of the bearings 24 and 26 may have a longitudinal air passage (not shown) that is in fluid communication with the chuck 12 and a pair of outer openings 60 located on opposing sides of the shaft 28. The outer openings 60 are in fluid communication with air channels 62 that are coupled to the positive air supply 56. The positive air supply 56 can provide air pressure which actuates a piston 64 within the chuck 12. Actuation of the piston 64 moves a rubber collar 66 in an upward direction and releases the disk 14. When the air pressure is terminated the collar 66 returns to grasp the disk 14.

In operation, an operator actuates the chuck 12 to move the collar 66 in an upward direction. A disk 14 is then placed onto the chuck 12 and the collar 66 is released to hold the disk 14. The spindle motor 10 is then energized to spin the disk 14 relative to the recording head 16. The recording head 16 initially writes a test signal(s) onto the disk 14 by applying magnetic fields to the disk surface.

The disk 14 is electrically grounded through the chuck 12, bearings 24 and 26, ionized air bearings 50 and housing 44. After a certification routine, the operator again actuates the chuck 12 and replaces the disk 16 with another part, wherein the process is repeated. The ionized air bearings 50 provide a reliable ground path that is less susceptible to variations in resistance because of vibrations and other mechanical loads, than ground pads of the prior art. Additionally, the ionized air bearing does not introduce any additional frictional forces on the spindle motor.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A spindle motor, comprising:

a housing;

a spindle located within said housing;

a motor that rotates said spindle relative to said housing;

an air bearing that allows relative movement between said spindle and said housing, wherein said air bearing contains a pressurized fluid;

an air supply that provides a flow of air to said air bearing; and, an ionizer that ionizes the flow of air from said air supply and the pressurized fluid within said air bearing to provide an electrically conductive path so that an electrical current flows between said spindle and said housing.

2. The spindle motor as recited in claim 1, further comprising a hemispherical shaped bearing that is attached to said spindle and separated from said housing by said air bearing.

3. The spindle motor as recited in claim 1, wherein an electrical resistance of said air bearing is no greater than 0.5 ohms.

4. The spindle motor as recited in claim 1, wherein said spindle rotates at a speed of at least 15,000 revolutions per minute.

5. A spindle motor for a certifier that tests a magnetic disk, comprising:

a housing;

a spindle pivotally connected to said housing;

a motor that rotates said spindle relative to said housing;

an air bearing that allows relative movement between said spindle and said housing, wherein said air bearing contains a pressurized fluid;

an air supply that provides a flow of air to said air bearing;

an ionizer that ionizes the flow of air from said air supply and the pressurized fluid within said air bearing to provide an electrically conductive path so that an electrical current flows between said spindle and said housing; and, a chuck that is connected to said spindle, said chuck captures the magnetic disk and is electrically connected to the magnetic disk so that the magnetic disk is electrically grounded to said housing through said spindle and said air bearing.

6. The spindle motor as recited in claim 5, further comprising a hemispherical shaped bearing that is attached to said spindle and separated from said housing by said air bearing.

7. The spindle motor as recited in claim 5, wherein an electrical resistance of said air bearing is no greater than 0.5 ohms.

8. The spindle motor as recited in claim 5, wherein said spindle rotates at a speed of at least 15,000 revolutions per minute.

9. The spindle motor as recited in claim 5, further comprising a certifier that electrically test the magnetic disk.

* * * * *